United States Patent [19]

Anderson

[11] Patent Number: 5,025,736
[45] Date of Patent: Jun. 25, 1991

[54] FURROW OPENER

[76] Inventor: Kevin M. Anderson, P.O. Box 32, Andover, S. Dak. 57422

[21] Appl. No.: 437,643

[22] Filed: Nov. 17, 1989

Related U.S. Application Data

[63] Continuation-in-part of Ser. No. 251,862, Oct. 3, 1988, Pat. No. D. 313,804.

[51] Int. Cl.⁵ ............................ A01C 5/06; A01C 5/08; A01C 23/02
[52] U.S. Cl. ................................ 111/152; 111/124; 111/188; 111/187; 111/80
[58] Field of Search .............. 111/109, 111, 124, 125, 111/73, 80, 152, 153, 154, 155, 186–189; 172/719, 747, 772

[56] References Cited

U.S. PATENT DOCUMENTS

| | | |
|---|---|---|
| 909,991 | 1/1909 | Cole . |
| 1,374,632 | 4/1921 | Blue ..................................... 111/152 |
| 2,048,441 | 7/1936 | Feltman . |
| 2,159,652 | 5/1939 | Brunner . |
| 2,259,303 | 10/1941 | Ewerth . |
| 2,874,656 | 2/1959 | Bennett . |
| 2,889,788 | 6/1959 | Van Dorn . |
| 2,924,189 | 2/1960 | McLeod . |
| 3,098,529 | 7/1963 | Wade et al. . |
| 3,122,111 | 2/1964 | Taylor, Sr. . |
| 3,126,969 | 3/1964 | Sewell ................... 172/719 |
| 3,188,988 | 6/1965 | Peck . |
| 3,296,985 | 1/1967 | Shelton . |
| 3,517,752 | 6/1970 | Glee ............................ 111/152 X |
| 3,707,132 | 12/1972 | Hansen . |
| 3,854,429 | 12/1974 | Blair . |
| 4,141,160 | 2/1979 | Olson ............................ 172/719 X |
| 4,278,036 | 7/1981 | Buchele . |
| 4,388,878 | 6/1983 | Demzin . |
| 4,417,530 | 11/1983 | Kopecky . |
| 4,446,801 | 5/1984 | Machnee et al. .................. 111/152 |
| 4,579,071 | 4/1986 | Johnson . |
| 4,638,748 | 1/1987 | Kopecky ................................. 111/7 |
| 4,669,922 | 6/1987 | Hooper et al. .................. 111/150 X |
| 4,674,419 | 6/1987 | Kopecky ............................. 111/152 X |
| 4,729,212 | 3/1988 | Rabitsch ............................. 56/119 |
| 4,770,112 | 9/1988 | Neumeyer . |
| 4,798,151 | 1/1989 | Rodrigues et al. ............. 111/187 X |
| 4,823,884 | 4/1989 | McCall . |
| 4,926,767 | 5/1990 | Thomas ............................. 111/187 |

FOREIGN PATENT DOCUMENTS

| | | | |
|---|---|---|---|
| 1809126 | 6/1970 | Fed. Rep. of Germany ...... | 172/747 |
| 320247 | 1/1972 | U.S.S.R. ............................. | 172/747 |
| 2199223 | 7/1988 | United Kingdom ................ | 111/152 |
| 8503618 | 8/1985 | World Int. Prop. O. .......... | 111/153 |

OTHER PUBLICATIONS

"Farm Show" article, vol. 9, No. 1985, p. 3, 9-9-85, Plastic Plow Bottoms Outlast Steel 4 to 1.
Poly Tech Industries, Inc. publication.
Poly-Hi brochure.

*Primary Examiner*—Danton D. DeMille
*Attorney, Agent, or Firm*—Burd, Bartz & Gutenkauf

[57] ABSTRACT

A furrow opener and press wheel for an agricultural implement to place fertilizer and seed at different depths in soil has replaceable abrasive resistant plastic side plates and a press plate to avoid soil build up and plugging of fertilizer discharge openings. The lateral distance between the side plates is adjustable so that seeding width can be changed. A seed divider attached to the furrow opener separates the seed into lateral rows on opposite sides of a band of fertilizer placed in the soil below the press plate.

34 Claims, 5 Drawing Sheets

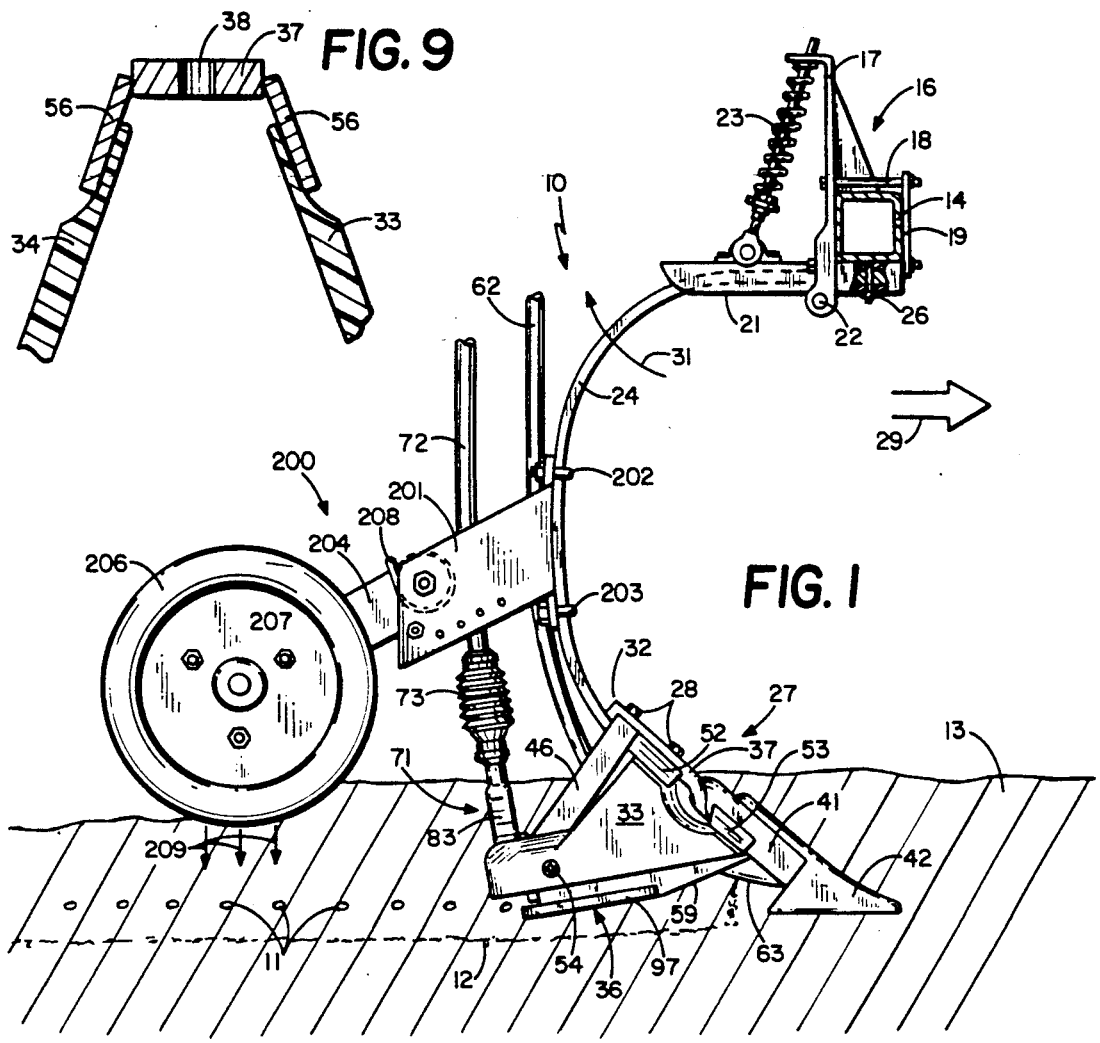
FIG. 9
FIG. 1
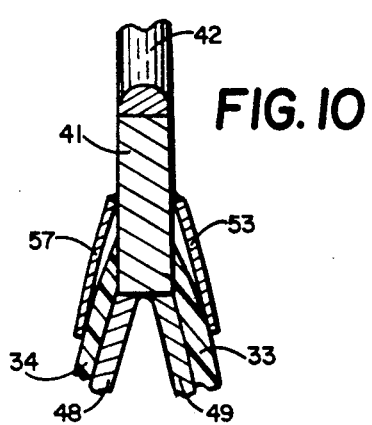
FIG. 10
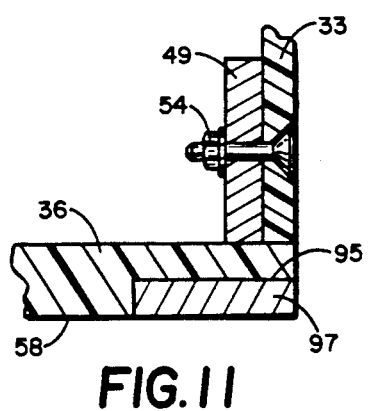
FIG. 11

FURROW OPENER

CROSS REFERENCE TO RELATED APPLICATION

This application is a continuation-in-part of U.S. application Ser. No. 251,862 filed Oct. 3, 1988 now U.S. Pat. No. Des. 313,804.

TECHNICAL FIELD

The invention is an agricultural earth working tool for placing seeds and fertilizers in soil. The tool has a furrow opener with abrasion resistant plastic side plates and a plastic press plate that places fertilizer in a band in the soil and seed in rows above and adjacent opposite sides of the band of fertilizer.

BACKGROUND OF THE INVENTION

It is common practice to use agricultural earth working implements having a plurality of tools to open furrows and deposit seeds and fertilizers into the soil. The tools have upwardly directed shanks with furrow openers having side members attached to the lower ends thereof. The furrow openers operate to deposit bands of fertilizer into the soil at a depth greater then the depth of seed. It is economically and environmentally advantageous to use only the amount of fertilizer required to support the crop. The band of fertilizer must be placed in the soil where it is accessible to the plants during the growing season. This requires accurate and consistent location of seed and fertilizer in the soil. Examples of earth working tools having furrow openers that attempt separate soil locations of seed and fertilizer are shown in U.S. Pat. Nos. 4,278,036; 4,388,878; 4,417,530 and 4,638,748. The furrow openers have metal points, press plates and side members that move in the soil. These parts must remain clean and free of soil to avoid excessive draft load and obstruction of fertilizer injection ports. Under some soil conditions soil will adhere and build up on the press plates and side members of the furrow openers. This causes wide furrows which exposes the seed and fertilizer, causes excessive draft loads; and plugs the fertilizer discharge openings. The furrow opener of the invention overcomes soil build up problems of the prior fertilizer and seed planting structures.

SUMMARY OF INVENTION

The furrow opener of the invention when mounted on a shank of an earthworking tool is used to place a band of fertilizer in the soil and deposit seed in rows in the soil above and adjacent opposite sides of the band of fertilizer. The seed is placed in rows on a firm seed bed formed by the furrow opener above and laterally adjacent opposite sides of the fertilizer. This fertilizing and seeding operation provides improved soil structure for effective seed germination and crop development. The furrow opener has a press plate and side plates mounted on a frame. The press and side plates can be separately removed from the frame to facilitate repair and replacement of the plates. The press plate and side plates are one-piece abrasion and impact resistant plastic members, such as ultra high molecular weight polyethylene, having a low coefficient of friction that are releasably mounted on the frame. The plastic press plate and side plates allow the opener to move through the soil with minimum draft load and eliminates soil build up on the furrow opener. The fertilizer discharge openings in the plastic press plate remain open as the soil does not collect on the press plate. The press plate provides a continuous firm seed bed above the band of fertilizer that promotes seed germination. The press plate is a generally flat abrasion and impact resistant and low friction plastic member having forwardly tapering sides and a generally flat bottom surface. Metal wear plates can be secured to opposite sides of th bottom of the press plate to reduce wear in abrasive soil. The bottom surface is inclined downwardly and rearwardly when mounted on the frame. A single bolt holds press plate on the frame. The side plates are one-piece impact and abrasion resistant and low friction plastic members mounted on the frame above the press plate. Each side plate has a linear bottom edge, a generally triangular shaped forward portion and a generally rectangular shaped rear portion. The forward portion has an upwardly and rearwardly inclined edge that fits under ears on the frame to retain the side plate on the frame. A bolt secures the rear portion of the side plate to the frame. When the bolt is released, the edge of the side plate can be moved from under the ears to remove the side plate from the frame.

The rear portions of the side members have inwardly directed extensions located rearwardly of and above the trailing edge of the press plate. The edges located above seed accommodating spaces reduce soil flow into the spaces and minimize bouncing and turning of seed as it is dispensed into rows adjacent opposite sides and above the band of fertilizer.

A seed dispenser operates to discharge seed to the areas under the extensions onto the first seed bed above and adjacent opposite sides of the band of fertilizer in the soil. The seed dispenser has downwardly diverging tubular members joined at a seed divider edge for separating seed carried in a tube leading to an air planting apparatus and directing seed into the tubular members. The seed is dispensed from the outlet ends of the tubular members into separate rows of seed. The lateral distance between the rear portions of the side plates can be adjusted to selectively increase or decrease the width of the seed rows.

DESCRIPTION OF DRAWING

FIG. 1 is a side elevational view, partly sectioned, of a combined furrow opener and press wheel for use with an air seed planter to place seed and fertilizers in the soil;

FIG. 9 is an enlarged sectional view taken along line 9—9 of FIG. 4;

FIG. 10 is an enlarged sectional view taken along line 10—10 of FIG. 4;

FIG. 11 is an enlarged sectional view taken along the line 11—11 of FIG. 4;

DESCRIPTION OF PREFERRED EMBODIMENT

Figure 2:
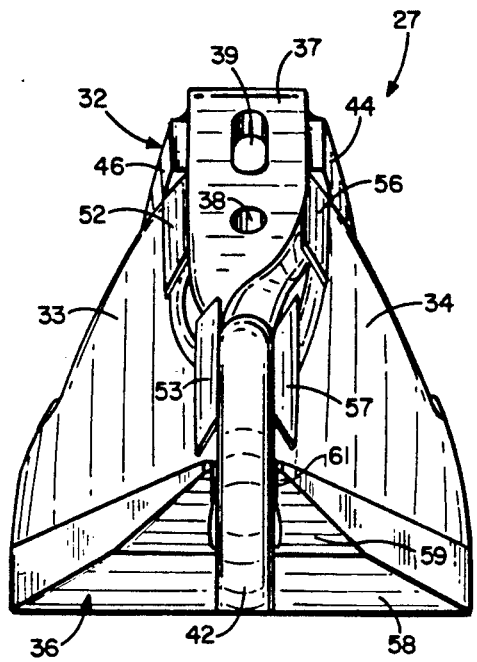
FIG. 2 is a front elevational view of the furrow opener of FIG. 1.

Referring to FIG. 1, there is shown a combined furrow opener and press wheel indicated generally at 10 usable with a chisel plow or field cultivator and an air seed planter to place seed 11 and fertilizer 12 and soil 13. The field cultivator has a conventional tool bar 14 carrying a clamp indicated generally at 16 for attaching a curved shank 24 to tool bar 14. Clamp 16 includes an upright support 17 mounted on tool bar 14 with a plurality of bolts 18 and a front plate 19. A generally horizontal box support 21 is pivoted to the lower end of support 17 with a transverse pivot pin 22. Box support 21 has a channel that accommodates the upper end of shank 24. A bolt 26 secures shank 24 to box support 21. A compression spring 23 interposed between the top of upright support 17 and box support 21 operates to bias shank 24 in a forward position to hold an earth working tool or furrow opener, indicated generally at 27, in soil 13. An example of a clamp to connect shank 24 to tool bar 14 is shown by Wade in U.S. Pat. No. 3,098,529, incorporated herein by reference. Other types of clamps and connecting structure can be used in lieu of clamp 16.

A plurality of bolts 28 secure earth working tool 27 to the lower end of shank 24. The implement is moved in a forward direction, as indicated by arrow 29, to precision place seed 11 and fertilizer 12 in elongated bands or rows in soil 13. When earth working tool 27 hits a rock or like obstruction tool 27 pivots backward and upwardly as indicated by arrow 31 against the biasing force of spring 23. As soon as tool 27 has passes the obstruction spring 23 returns tool 27 back to its earth working position.

Earth working tool 27 has a frame indicated generally at 32 that is secured to the lower end of shank 24. Side plates 33 and 34 are attached to opposite sides of frames 32. A bottom shelf or press plate 36 is connected to the bottom of tool 27 adjacent the lower edges of side plates 33 and 34. Plates 33, 34 and 36 are constructed of an abrasion and impact resistant plastic, such as ultra high molecular weight polyethylene containing glass fibers. The plastic material also has a low coefficient of friction so that soil will not adhere to it. A plastic material which has these qualities and is suited to molding and machining to the required shape is ultra high molecular weight polethylene plastic containing glass fibers. One product of this type is marketed by Poly Tech Industries, Inc. Monticello, Ga. The soil even under wet conditions does not adhere to the low friction plastic side plates 33 and 34 and press plate 36. The plastic side plates 33 and 34 and press plate 36 allows the earth working tool to flow through the soil with a minimum of draft load and without the soil buildup on the earth working tool. The ultra high molecular weight plastic of side plates 33 and 34 and press plate 36 is impact resistant as they have elastic memory characteristics that allow plates 33, 34, and 36 to return to their original position after they have been deformed by a rock or other obstruction in the soil. The plastic materials of press plate 36 also function as an insulator so that when anhydrous amonia is injected into the ground press plate 36 does not freeze up.

Figure 3:
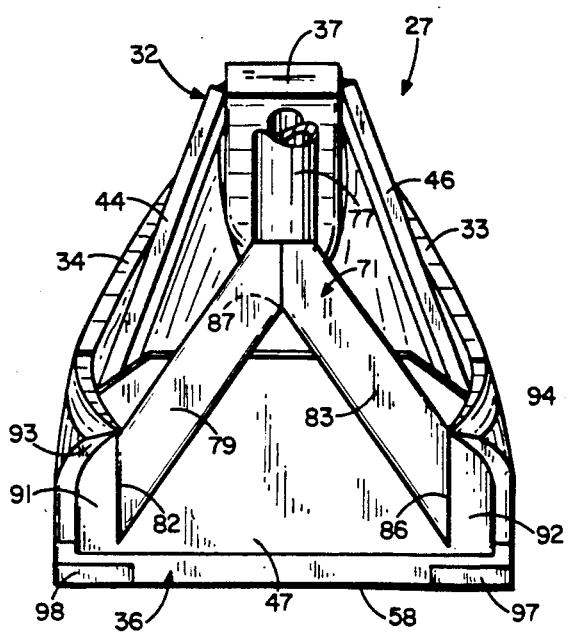
FIG. 3 is a rear elevational view of the furrow opener.
Figure 4:
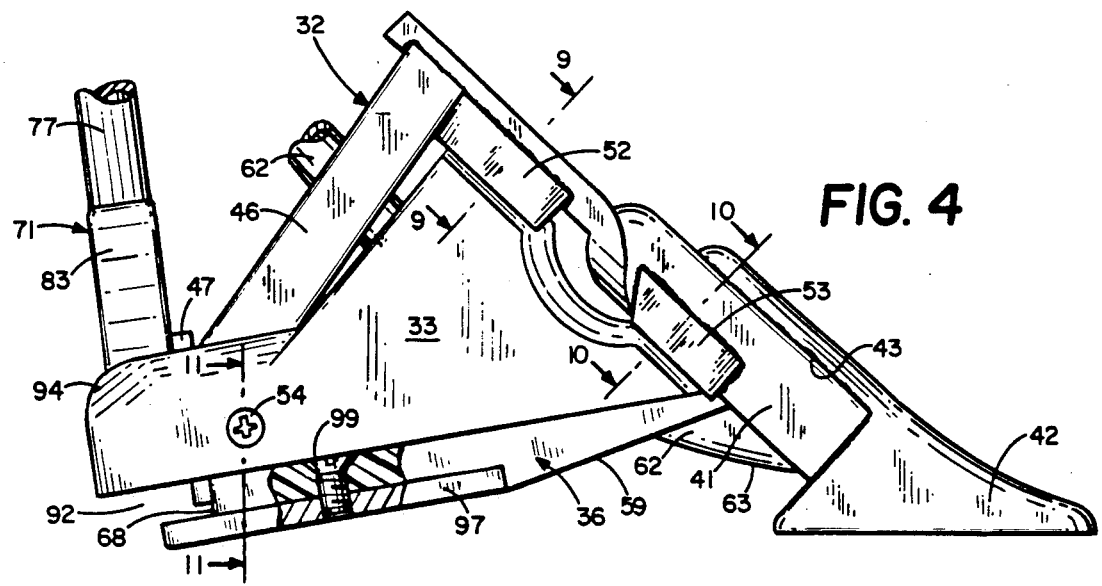
FIG. 4 is a side elevational view of the furrow opener.
Figure 5:
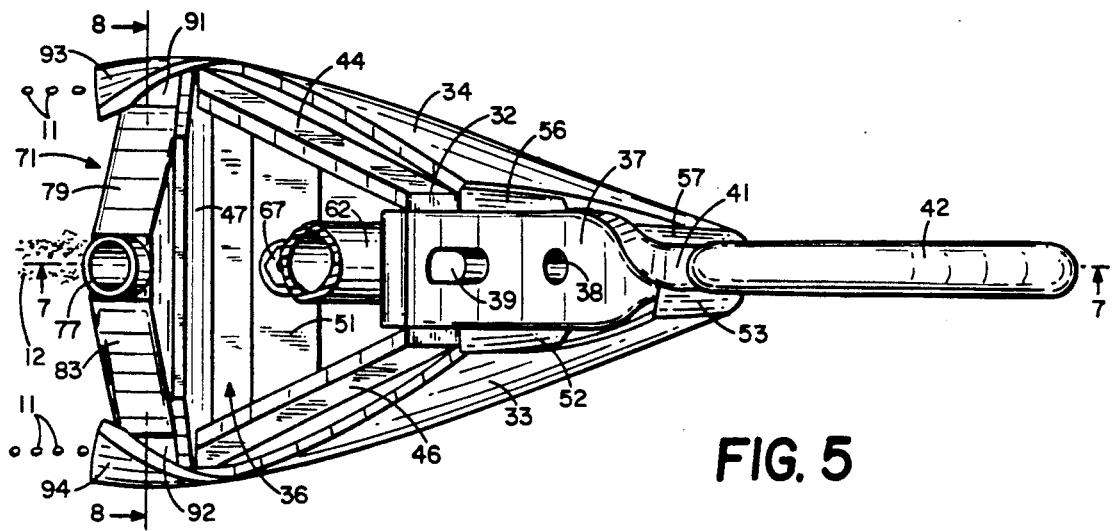
FIG. 5 is a top plan view of the furrow opener.

As shown in FIGS. 2 and 4, frame 32 has a body 37 provided with a hole 38 and an elongated slot 39 for accommodating bolts 28 that attach the tool to the lower end of shank 24. Body 37 has a downwardly projected leg 41 that is turned normal to the plane of body 37. A wear resistant metal point or shoe 42 is secured by welds 43 to leg 41. Shoe 42 penetrates and breaks the soil into a furrow for the band of fertilizer 12 during movement of the tool in the soil. As shown in FIGS. 3 and 5, frame 32 includes side braces 44 and 46 that are secured to the upper end of body 37 and extend downwardly and rearwardly to a cross plate 47. A pair of side bars 48 and 49 extend forwardly from opposite ends of cross plate 47 to the back of leg 41. As seen in FIG. 10, side bars 48 and 49 are secured by welds to leg 41.

Figure 7:
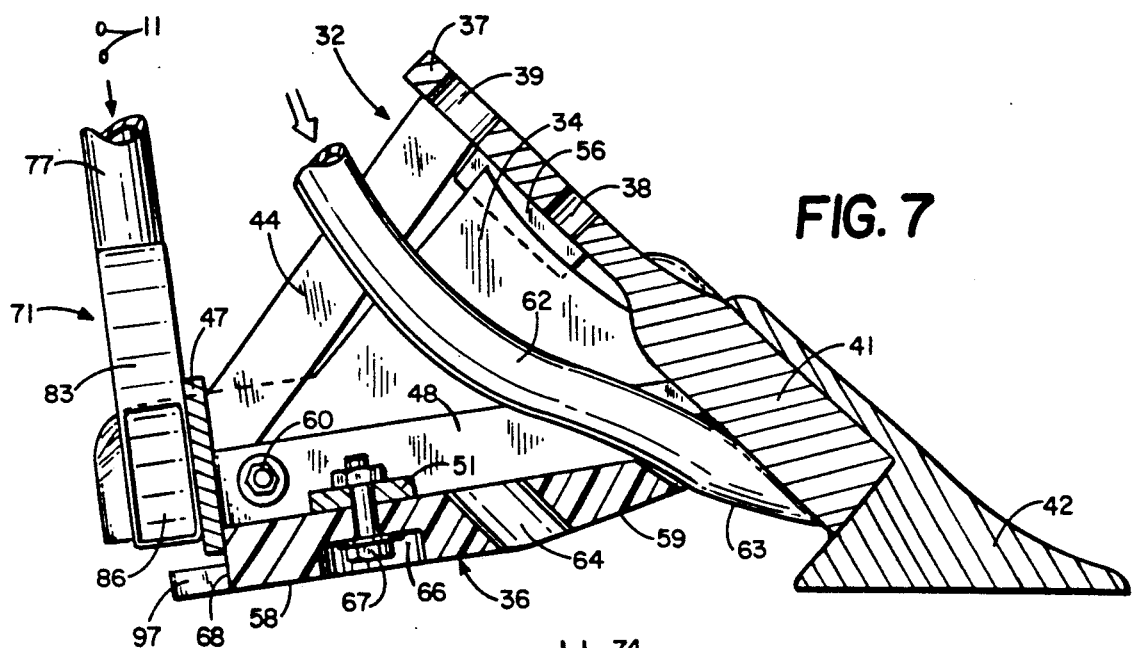
FIG. 7 is a large sectional view taken along the line 7—7 of FIG. 5.

Referring to FIGS. 2, 4, and 5, side plate 33 is mounted on frame 32 with a pair of ears 52 and 53 secured to a side of body 37. Ears 52 and 53 can be a single ear or tab joined to body 37. A bolt 54 secures a rear portion of side plate 33 to side bar 49 as seen in FIG. 11. The forward edge of side plate 33 fits under ears 52 and 53 as shown in FIGS. 9 and 10. When bolt 54 is removed side plate 33 can be removed from frame 32 and replaced with another side plate. Side plate 34 is retained on body 37 with a pair of ears 56 and 57 secured to body 37, as shown in FIGS. 9 and 10, and a bolt 60, as shown in FIG. 7. Ears 56 and 57 can be a single ear secured to body 37. Bolt 60 is removable from side bar 48 to allow the side plate 34 to be removed from frame 32 and replaced with a new side plate.

Figure 6:
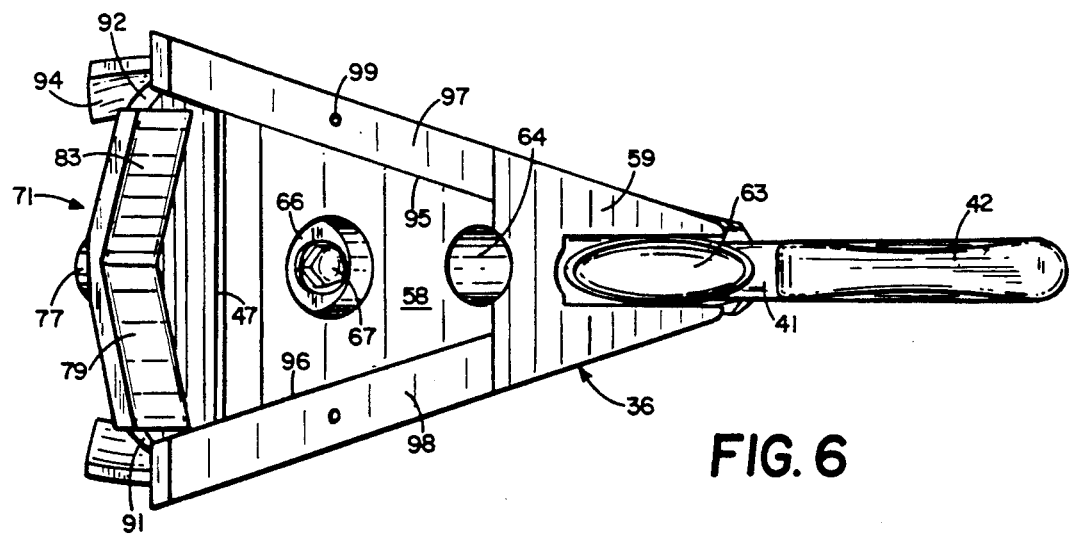
FIG. 6 is a bottom view of the furrow opener.

Turning to FIGS. 6 and 7, press plate 36 has a generally flat bottom surface 58 and upwardly and forwardly inclined front surface 59. Bottom surface 58 has side recesses or grooves 95 and 96 accommodating hard metal wear plates or inserts 97 and 98. Wear plates 97 and 98 have bottom surfaces co-extensive with bottom surface 58 of press plate 36 and rear end sections that project rearwardly from the back of press plate 36. The bottom surfaces of wear plates can be chrome coated to increase wear life. The rear end sections of plates 97 and 98 located at the bottom of the seed dispensing spaces 91 and 92 form grooves in the soil seed bed for the seed and reduce churning and bouncing of the seed and soil in spaced 91 and 92. As shown in FIG. 4, a bolt 99 threaded into a center hole in wear plate 97 secures wear plate to press plate 36. Bolt 99 can be removed to permit end-to-end turning and replacement of wear plate 97. A similar bolt (not shown) secures wear plate 98 to press plate 36. The midsection of front surface 59 has an elongated slot 61 that accommodates the lower end of tube 62 for carrying fertilizer to an area immediately behind shoe 42. Tube 62 has an open lower end 63 in front of press plate 36. Tube 62 is an elongated plastic tube that leads to the fertilizer dispensing apparatus (not shown) of the implement. Tube 62 carries granular fertilizer as well as anhydrous amonia. Press plate 36 has a hole 64 for accommodating a second tube (not shown) for dispensing additional fertilizer or herbicides into the soil behind shoe 42. Press plate 36 is mounted on cross bar 51 with a bolt 67. The head of bolt 67 is located in a countersunk bore 66 so that bolt 67 does not interfere with the movement of bottom surface 58 of press plate 36 over the soil. Bolt 67 retains rear end 68 of press plate 36 in engagement with the lower edge of cross plate 47, as seen in FIG. 7.

Figure 8:
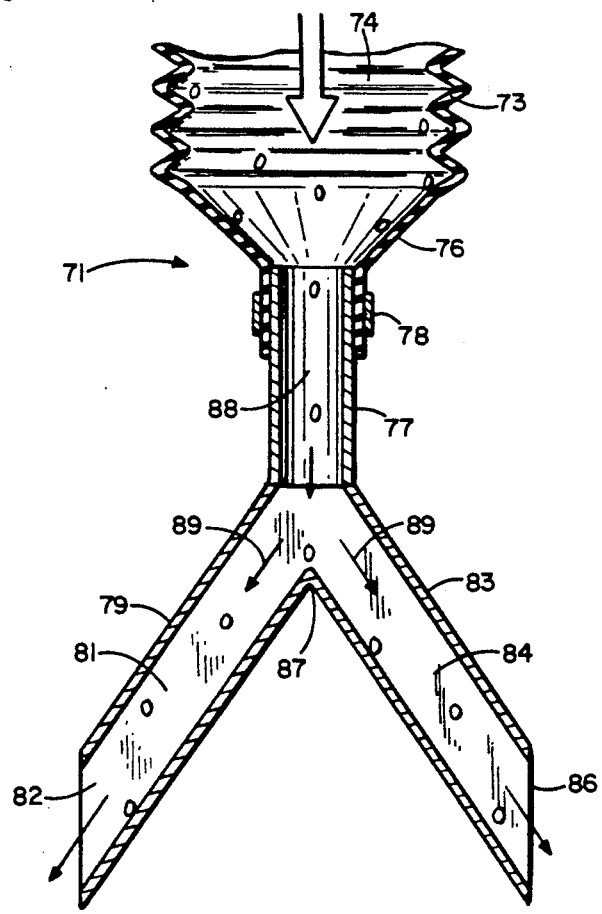
FIG. 8 is an enlarged sectional view taken along line 8—8 of FIG. 5.

As shown in FIGS. 1, 3, 5, 6, and 7, a seed dispenser indicated generally at 71 is mounted on the rear of cross plate 47. Seed dispenser 71 is operable to divide the seed and deposit the seed in separate parallel rows in the seed bed above and adjacent opposite sides of the band of fertilizer 12 as shown in FIG. 5. The seed is delivered to the seed dispenser 71 through a hose 72 that is connected to an air seed planter apparatus (not shown). Hose 72 is coupled to an enlarged corrugated de-acceleration tube 73. As shown in FIG. 8, the seed is dispensed into de-acceleration tube 73 along with air. The enlarged internal passage 74 of tube 73 reduces the speed of the flowing air and causes the seed to engage the corrugations on the sidewalls of the tube. The seed is uniformly mixed with the air moving through passage 74 so that the seed-to-air ratio is substantially constant. The lower end of de-acceleration tube 73 has downwardly and inwardly directed cone shaped outlet 76 that is attached to an upright tube 77 with a band clamp 78. The air and seed flows into passage 88 of tube 77 and into passages 81 and 84 of downwardly diverging tubular members or tube branches 79 and 83. Branch 79 has an exit or outlet end 82. Branch 83 has an exit or outlet end 86. Outlet ends 82 and 86 are laterally spaced from each other so that the seed is dispensed into parallel rows onto a firm seed bed behind press plate 36. The firm seed bed serves as a moisture barrier that promotes seed germination. This is particularly advantagous in dry soil conditions. Branches 79 and 83 have a common divider edge 87 that is located in alignment with the longitudinal axis of passage 88 of tube 77. The divider edge function to divide the air stream and cause the seed and air to be diverted into passages 81 and 84 of branches 79 and 83. Since the seed-to-air ratio is substantially constant a substantially equal quanity of seed is diverted into each of passages 81 and 84 during the operation of the air seed planter. Divider edge 84 also splits the air stream that is moving through passage 88 into two substantially equal streams that flow through branch passages 81 and 84 which carry the speed through passages 81 and 84 and outlet ends 82 and 86 respectively. Arrow 89 indicate the flow of the air and the seed in passages 81 and 84.

Referring FIGS. 3 and 5, outlet ends 82 and 84 of branches 79 and 83 are located adjacent spaces 91 and 92 on the insides of the rear portions of side plates 33 and 34. The seed dispensed into spaced 91 and 92 is deposited into the soil in parallel rows as indicated in FIG. 5. Side plates 33 and 34 have inwardly turned corner projections or extensions 93 and 94 that extend over the spaces 91 and 92 to minimize the movement of soil into spaces 91 and 92 and prevent the plugging of outlet ends 82 and 86. Projections 93 and 94 also reduce churning and bouncing of the seed directed into spaces 91 and 92 by the diverging tubular members 79 and 83.

The earth working tool 10 having furrow opener 27 is used to incorporate an amount of fertilizer into the soil that supports only the searsons growth of the crop. Excessive amounts of fertilizer are not required thereby reducing fertilizer costs and losses which are enviormentally incompatible. The precision placement of fertilizer and seed in the soil is particularly advantagous in low fertility testing soils. The fertilizer is placed in a band in the soil at the time of seed planting which reduces wind and water erosion as well as cost and labor of separate fertilizer applications. The seed is placed on a firm seed bed in rows adjacent opposite sides and above the band of fertilizer. The rows of seed and band of fertilizer are in a vertical T zone in the soil bed wherein the fertilizer is accessible to plants during the growing season. Press plate 36 and wear plates 97 and 98 attached thereto compress the soil forming a moisture barrier whereby seed is placed in soil having a moisture content that promotes seed germination.

Referring to FIG. 1, a packer wheel assembly indicated generally at 200 is located behind the earth working tool 10 to compress the soil into firm contact with seeds 11 and fertilizer 12. Packer wheel assembly can be the wheel assembly disclosed in U.S. Pat. No. 4,579,071. A U-shaped member 201 is attached with U-bolts 202 to mid-portion of the shank 24. The U-shaped member pivotly supports an arm tool 4 that is attached to a wheel 206 with an axle 207. A pair of wheels can be attached to arm 204 to compress the soil as indicated by arrows 209 above the rows of seed 11. Torsion spring 208 engagable with arm 204 biases wheel 206 in a downward direction. Other types of packer wheel assemblies can be used with earth working tool 27.

Figure 12:
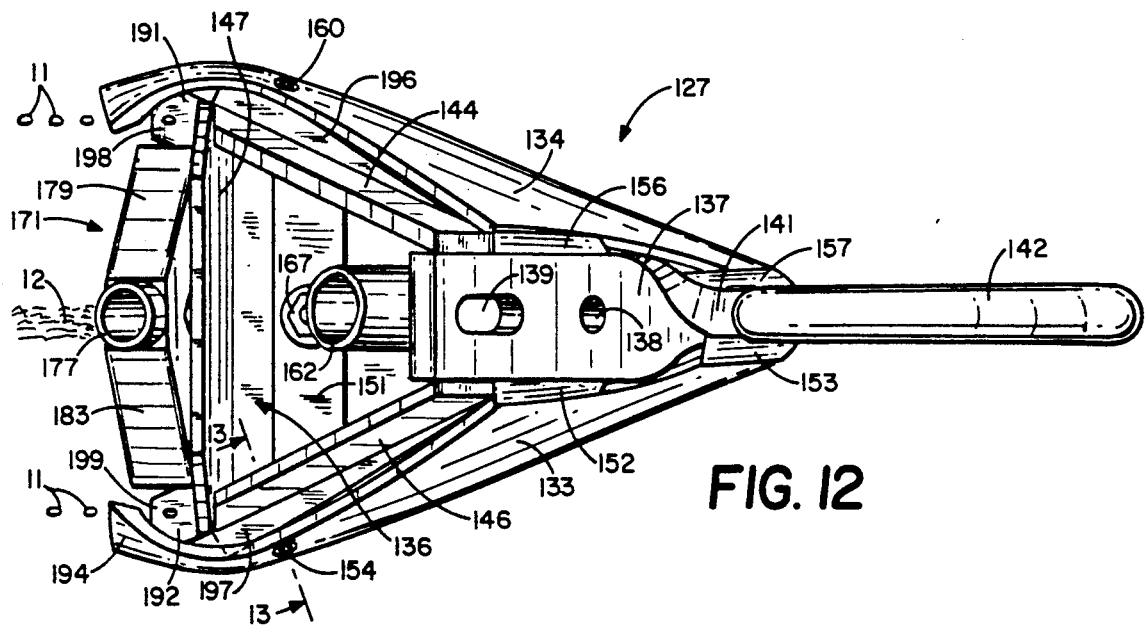
FIG. 12 is a top plan view of a modification of the furrow opener of the invention.
Figure 13:
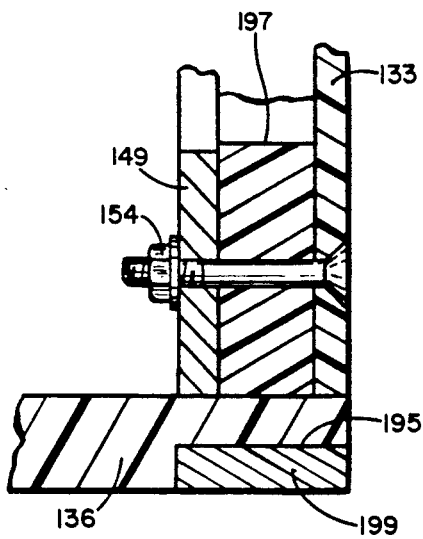
FIG. 13 is an enlarged sectional view taken along line 13—13 of FIG. 12.

Referring to FIGS. 12 and 13, there is shown a modificaion of the earth working tool indicated generally at 127 of the invention. Tool 127 has the same as tool 27 identified with the same reference numerals having a prefix of 1. Earth working tool 127 has been laterally adjusted to increase the distance between the rows of seed 11. Spacers 196 and 197 are located between the side bars 148 and 149. Bolts 154 and 160 secure the side plates 133 and 134 to the spacers 196 and 197 and side bars 148 and 149 as shown in FIG. 13. Spacers 196 and 197 have a genrally triangular configuration with outer surfaces and surface engagement with the side bars 148 and 149 and the surfaces of the side plates 133 and 134. A width of the spacers 196 and 197 can be selected to provide for a desired lateral spacing of the lateral rows of seed 11. Wear plates 197 and 198 are secured to opposite sides of press plate 136.

While there has been shown and described preferred embodiments of the invention, it is understood that changes in the structure, materials, and arrangement of structure can be made by those skilled in the art without departing from the invention. The invention is defined in the following claims.

I claim:

1. A furrow opener for an earth working tool comprising: a frame, a forwardly directed shoe secured to the frame for making a furrow in soil, a press plate of abrasive resistant and low friction plastic located behind and above said shoe for compressing soil above the bottom of the furrow made by the shoe, said press plate having opposite rearwardly diverging side edges and a transverse rear edge, a bottom surface, and side grooves along said side edges open to the bottom surface, abrasion resistant means located in said grooves having surfaces generally coextensive with said bottom surface, said abrasion resistant means comprise linear rectangular hard metal members having rear end portions projected rearwardly from said rear edge of the press plate, means securing the abrasion resistant means to said press plate, means releasably connecting the press plate to said frame whereby the press plate can be removed from the frame and replaced with a similar press plate, a first side plate of abrasive resistant and low friction plastic located above one side edge of the press plate adjacent one side of the frame, said first side plate having a rear portion extended rearwardly of the transverse edge of the press plate, means releasably connecting the first side plate to the frame whereby the first side plate can be removed and replaced with a similar side plate, a second side plate of abrasive resistant and low friction plastic located above the other side edge of the press plate adjacent the other side of the frame, said second side plate having a rear portion extended rearwardly of the transverse edge of the press plate, and means releasably connecting the second side plate to the frame whereby the second side plate can be removed and replaced with a similar side plate.

2. The furrow opener of claim 1 wherein: the press plate has a rearwardly and downwardly inclined bottom surface.

3. The furrow opener of claim 1 wherein: each side plate has a rearwardly and outwardly directed outside surface.

4. The furrow opener of claim 3 wherein: each side plate has a generally triangular forward portion and an elongated rectangular rear portion.

5. The furrow opener of claim 1 including: means for carrying fertilizer and discharging fertilizer into the soil behind the shoe and below the press plate, and seed dispensing means secured to the frame for placing seed in rows in the soil adjacent the first and second side plates on opposite sides and above the fertilizer in the soil.

6. A furrow opener for an earth working tool comprising: a frame, a forwardly directed shoe secured to the frame, a press plate of abrasive resistant and low friction plastic located behind said shoe, said press plate having rearwardly diverging sides and a transverse rear edge, a bottom surface having grooves along opposite sides thereof, wear plates located in said grooves, said wear plates have end portions projected rearwardly from the transverse rear edge of the press plate, means securing the wear plates to said press plate, means releasably connecting the press plate to said frame whereby the press plate can be removed from the frame and replaced with a similar press plate, a first side plate of abrasive resistant and low friction plastic located above the press plate adjacent one side of the frame, means releasably connecting the first side plate to the frame whereby the first side plate can be removed and replaced with a similar press plate, a second side plate of resistant and low friction plastic located above the press plate located adjacent the other side of the frame, and means releasably connecting the second side plate to the frame whereby the second side plate can be removed and replaced with a similar side plate.

7. A furrow opener for an earth working tool comprising: a frame, a forwardly directed shoe secured to the frame, a press plate of abrasive resistant and low friction plastic located behind said shoe, said press plate having a bottom surface having groove means therein, wear insert means located in said groove means, means securing the wear insert means to said press plate, said press plate has a rear edge, said wear insert means having an end portion projected rearwardly from the rear edge of the press plate, means releasably connecting the press plate to said frame whereby the press plate can be removed from the frame and replaced with a similar press plate, a first side plate of abrasive resistant and low friction plastic located above the press plate adjacent one side of the frame, means releasably connecting the first side plate to the frame whereby the first side plate can be removed and replaced with a similar side plate, a second side plate of abrasive resistant and low friction plastic located above the press plate adjacent the other side of the frame, and means releasably connecting the second side plate to the frame whereby the second side plate can be removed and replaced with a similar side plate.

8. A furrow opener for an earth working tool comprising: a frame, a forwardly directed shoe secured to the frame, a press plate of abrasive resistant and low friction plastic located behind said shoe, means releasably connecting the press plate to said frame whereby the press plate can be removed from the frame and replaced with a similar press plate, a first side plate of abrasive resistant and low friction plastic located above the press plate adjacent one side of the frame, means releasably connecting the first side plate to the frame whereby the first side plate can be removed and replaced with a similar side plate, a second side plate of abrasive resistant and low friction plastic located above the press plate adjacent the other side of the frame, and means releasably connecting the second side plate to the frame whereby the second side plate can be removed and replaced with a similar side plate, each side plate having a rearwardly and outwardly directed outside surface, a generally triangular forward portion and an elongated rectangular rear portion, said rear portion includes an inwardly directed extension.

9. A furrow opener for an earth working tool comprising: a frame, a forwardly directed shoe secured to the frame, a press plate of abrasive resistant and low friction plastic located behind said shoe, means releasably connecting the press plate to said frame whereby the press plate can be removed from the frame and replaced with a similar press plate, a first side plate of abrasive resistant and low friction plastic located above the press plate adjacent one side of the frame, means releasably connecting the first side plate to the frame whereby the first side plate can be removed and replaced with a similar side plate, a second side plate of a abrasive resistant and low friction plastic located above the press plate adjacent the other side of the frame, and means releasably connecting the second side plate to the frame whereby the second side plate can be removed and replaced with a similar side plate, each side plate has an inwardly directed extension located rearwardly of the press plate.

10. The furrow opener of claim 9 including: a seed dispenser mounted on said frame, said dispenser having a pair of tubular members for directing seed toward the side plates under said extensions.

11. The furrow opener of claim 10 wherein: said tubular members have upper ends joined together forming a seed divider edge for directing seed into each of the tubular members.

12. The furrow opener of claim 9 including a seed dispenser mounted on the frame for dispensing seed adjacent said side plates, said dispenser having a seed delivery tube and a pair of downwardly diverging tubular members joined to the seed delivery tube, said tubular members having upper ends joined together to form a transverse edge along the axis of the seed delivery tube to divide and direct seed into the tubular members whereby seed is dispensed from said tubular members in spaced rows into the soil.

13. The furrow opener of claim 9 wherein: the press plate and side plates are ultra high molecular weight polyethylene plastic members.

14. A furrow opener for an earth working tool comprising: a frame, a forwardly directed shoe secured to the frame, a press plate of abrasive resistant and low friction plastic located behind said shoe, said press plate having rearwardly diverging side edges, a rear edge, a bottom surface, and side grooves along said side edges open to the bottom surface, abrasion resistant means located in said grooves having surfaces generally co-extensive with said bottom surface, means securing the abrasion resistant means to said press plate, means releasably connecting the press plate to said frame whereby the press plate can be removed from the frame and replaced with a similar press plate, a first side plate of abrasion resistant and low friction plastic located above the press plate adjacent one side of the frame, means releasably connecting the first side plate to the frame whereby the first side plate can be removed and replaced with a similar side plate, a second side plate of abrasion resistant and low friction plastic located above the press plate adjacent the other side of the frame, and means releasably connecting the second side plate to the frame whereby the second side plate can be removed and replaced with a similar side plate, each side plate has an inwardly directed extension rearwardly of the rear edge of the press plate, and said abrasion resistant means having end portions projected rearwardly from said rear edge of the press plate generally below said extension of the side plates.

15. A furrow opener for an earth working tool comprising: a frame, a forwardly directed shoe secured to the frame, a press plate of abrasive resistant and low friction plastic located behind said shoe, means releasably connecting the press plate to said frame whereby the press plate can be removed from the frame and replaced with a similar press plate, a first side plate of abrasive resistant and low friction plastic located above the press plate adjacent one side of the frame, means releasably connecting the first side plate to the frame whereby the first side plate can be removed and replaced with a similar side plate, a second side plate of abrasive resistant and low friction plastic located above the press plate adjacent the other side of the frame, and means releasably connecting the second side plate to the frame whereby the second side plate can be removed and replaced with a similar side plate, means for carrying fertilizer and discharging fertilizer into the soil behind the shoe and below the press plate, and seed dispensing means secured to the frame for placing seed in rows in the soil adjacent the first and second side plates on opposite sides and above the fertilizer in the soil, said first and second side plates have inwardly directed extensions extended over the spaces where the seed is placed in rows in the soil by the dispensing means.

16. The furrow opener of claim 15 including: wear resistant means secured to the press plate, said wear resistant means having portions projected from the press plate into the space where the seed is placed in rows in the sort by the dispensing means.

17. The furrow opener of claim 15 wherein: said seed dispensing means has a pair of downwardly diverging tubular members having upper ends joined together forming a seed divider edge for directing seed into each of the tubular members, said seed being discharging into spaces adjacent the first and second side plates.

18. A furrow opener for an earth working tool operable to place a band of fertilizer in the soil and plant seeds in rows adjacent opposite sides and above the band of fertilizer comprising: a frame, press plate means including an abrasive resistant and low friction plastic member located on the frame, means securing the press plate means to the frame, tubular means for carrying fertilizer and discharging fertilizer into the soil below said press plate means, side plate means located above the press plate means for opening a furrow in the soil, means securing the side plate means to the frame, and seed dispensing means secured to the frame for placing seed in rows in the soil adjacent the side plate means on opposite sides and above the fertilizer in the soil, said member of the press plate means has a rear edge and a bottom surface having groove means, abrasion resistant means located in the groove means, means securing the abrasion resistant means to the member, said abrasion resistant means having end portions projected rearwardly from said rear edge of the member into the spaces where the seed is placed in the soil.

19. The furrow opener of claim 18 wherein: the side plate means have extensions located over the spaces where the seed is placed in the soil.

20. The furrow opener of claim 18 wherein: the seed dispensing means has a pair of downwardly diverging tubular members having upper ends joined together forming a seed divider edge for directing seed into each of the tubular members, said seed being discharged into spaces adjacent the side plate means.

21. The furrow opener of claim 18 wherein: the press plate means has rearwardly diverging side edges, a rear edge, and a bottom surface extended between said side and rear edges.

22. The furrow opener of claim 18 wherein: the side plate means comprise a pair of side plates, each side plate having a generally triangular forward portion and an elongated rectangular rear portion.

23. A furrow opener for an earth working tool operable to place a band of fertilizer in the soil and plant seeds in rows adjacent opposite sides and above the band of fertilizer comprising: a frame, press plate means located on the frame, means securing the press plate means to the frame, tubular means for carrying fertilizer and discharging fertilizer into the soil below said press plate means, side plate means located above the press plate means for opening a furrow in the soil, means securing the side plate means to the frame, and seed dispensing means secured to the frame for placing seed in rows in the soil adjacent the side plate means of opposite sides and above the fertilizer in the soil, said side plate means comprising a pair of side plates, each side plate having a generally triangular forward portion and an elongated rectangular rear portion, said rear portion includes an inwardly directed extension.

24. The furrow opener of claim 20 wherein: the press plate means and side plate means have ultra high molecular weight polyethylene plastic members.

25. A press plate for a furrow opener comprising: an ultra high molecular weight plastic member having rearwardly diverging sides edges and a transverse rear edge extended between said side edges, a generally flat bottom surface extended between said side edges and rear edge, said member having side grooves along said side edges open to the bottom surface, wear resistant means located in said grooves having surfaces generally co-extensive with said bottom surface, said wear resistant means having rear end portions projected rearwardly from said rear edge of the member, and means securing the wear resistant means to said member.

26. The press plate of claim 25 including: a longitudinal slot located in a forward portion of the member.

27. The press plate of claim 25 including: a hole located in a forward portion of the member.

28. The press plate of claim 25 including: a longitudinal slot located in a forward portion of the member and at least one hole in said member adjacent said slot.

29. The press plate of claim 25 wherein: said wear resistant means comprise linear rectangular metal members having rear end portions projected rearwardly from said rear edge of the plastic member.

30. The press plate of claim 25 wherein: said wear resistant means comprise hard metal inserts located in said grooves.

31. A press plate for a furrow opener comprising: an ultra high molecular weight plastic member having side edges and a rear edge extended between said side edges, a generally flat bottom surface extended between said side edges and rear edge, wear resistant means located along said side edges having bottom surfaces adapted to engage the soil, said wear resistant means having rear end portions projected rearwardly from said rear edge of the member, and means securing the wear resistant means to said member.

32. The press plate of claim 31 including: a longitudinal slot located in a forward portion of the member.

33. The press plate of claim 31 including: a hole located in a forward portion of the member.

34. The press plate of claim 31 including: a longitudinal slot located in a forward portion of the member and at least one hole in said member adjacent said slot.

* * * * *